United States Patent
Tatsumi et al.

(10) Patent No.: US 8,668,993 B2
(45) Date of Patent: Mar. 11, 2014

(54) ALUMINUM ALLOY CLAD MATERIAL

(75) Inventors: Akihiko Tatsumi, Kobe (JP); Shinji Sakashita, Kobe (JP); Satoshi Yoshida, Kobe (JP); Shimpei Kimura, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 184 days.

(21) Appl. No.: 12/836,980

(22) Filed: Jul. 15, 2010

(65) Prior Publication Data

US 2011/0027610 A1    Feb. 3, 2011

(30) Foreign Application Priority Data

Jul. 28, 2009   (JP) ................................ 2009-175748

(51) Int. Cl.
*B32B 15/20* (2006.01)
*F28F 19/06* (2006.01)
*F28F 21/08* (2006.01)
*C22C 21/10* (2006.01)
*C22C 21/00* (2006.01)

(52) U.S. Cl.
USPC ............................ 428/654; 428/933; 165/905

(58) Field of Classification Search
None
See application file for complete search history.

(56) References Cited

U.S. PATENT DOCUMENTS

| | | | |
|---|---|---|---|
| 2007/0246509 A1* | 10/2007 | Koshigoe et al. | 228/101 |
| 2009/0165901 A1* | 7/2009 | Koshigoe et al. | 148/535 |
| 2010/0183897 A1* | 7/2010 | Kobayashi et al. | 428/654 |
| 2011/0027610 A1 | 2/2011 | Tatsumi et al. | |
| 2011/0192583 A1* | 8/2011 | Sakashita et al. | 165/177 |
| 2011/0287277 A1* | 11/2011 | Kimura et al. | 428/555 |

FOREIGN PATENT DOCUMENTS

| | | | |
|---|---|---|---|
| CN | 101469960 A | | 7/2009 |
| EP | 0637481 | * | 2/1995 |
| EP | 0712681 | * | 5/1996 |
| JP | 11-61306 | | 3/1999 |
| JP | 2006-131923 | | 5/2006 |
| JP | 2006-176852 | | 7/2006 |
| JP | 2009-127121 | | 6/2009 |

OTHER PUBLICATIONS

Chinese Office Action issued Mar. 29, 2012, in Patent Application No. 201010222689.4 (with English-language translation).
Japanese Office Action dispatched Mar. 19, 2013 in corresponding Japanese Application No. 2009-175748 with English translation, 5 pp.
U.S. Appl. No. 13/795,891, filed Mar. 21, 2013, Kimura, et al.
U.S. Appl. No. 13/795,550, filed Mar. 12, 2013, Kimura, et al.

* cited by examiner

*Primary Examiner* — John J Zimmerman
(74) *Attorney, Agent, or Firm* — Oblon, Spivak, McClelland, Maier & Neustadt, L.L.P.

(57) ABSTRACT

Disclosed is an aluminum alloy clad material which includes a core material; a sacrificial anode material on one surface of the core material; and a filler material on the other surface of the core material and composed of an Al—Si alloy, in which the core material contains 0.3 to 2.0 percent by mass of Mn, 0.15 to 1.6 percent by mass of Si, 0.1 to 1.0 percent by mass of Cu, and 0.1 to 1.0 percent by mass of Mg, with the remainder including Al and inevitable impurities, the sacrificial anode material contains 7.0 to 12.0 percent by mass of Zn, 0.3 to 1.8 percent by mass of Mn, and 0.3 to 1.2 percent by mass of Si, with the remainder including Al and inevitable impurities, and has a thickness of 10 to 30 µm. The sacrificial anode material shows resistance to both local corrosion and general corrosion.

21 Claims, No Drawings ent. The clad materials disclosed in the above documents, if designed to have a small thickness, may suffer from early wearing of the sacrificial anode material, because they are provided not for resistance to corrosion on the entire surface (general corrosion) but for resistance to pitting corrosion (local corrosion).
ALUMINUM ALLOY CLAD MATERIAL

FIELD OF THE INVENTION

The present invention relates to aluminum alloy clad materials to be adopted to brazing sheets for use typically in automotive heat exchangers.

BACKGROUND OF THE INVENTION

Heat exchangers such as radiators, condensers, and evaporators to be mounted to automobiles are often prepared by forming, assembling, and brazing aluminum alloy sheet materials, because such aluminum alloy materials are lightweight and have satisfactory thermal conductivity. Such aluminum alloy sheets, when formed into tubes typically of radiators, for example, are exposed to the atmosphere (air) on the outer surface and exposed to a coolant such as cooling water on the inner surface. When the aluminum alloy sheets are exposed to these corrosive surroundings, corrosion (pitting corrosion) may locally proceed and may lead to the formation of through holes. For corrosion protection of the outer surface of the tube, so-called "cathodic protection" (electrolytic protection) is generally adopted and is known to be effective. In the cathodic protection, a fin material is brought into contact with the outer surface of the tube, which fin material is composed of an Al—Zn alloy or another substance being less noble in potential than the aluminum alloy constituting the tube. The cathodic protection is often adopted also for the corrosion protection of the inner surface of the tube. Specifically, such a tube is generally formed from a clad material, which clad material includes a base material (core material) composed of an aluminum alloy, and a sacrificial anode material cladded on the inner surface of the core material and composed of an Al—Zn alloy which is less noble in potential than the aluminum alloy of the core material. The clad material is often a clad material (blazing sheet) which further includes a filler material cladded on the outer surface of the core material and has three or more layers. The filler material is composed of an Al—Si alloy and contributes to the blazing typically with a fin material. Independently, such a clad material should have a thin wall thickness (gauge) of about 0.3 mm or less, from the viewpoint of reducing the weight of an apparatus to which the clad material is adopted.

Such aluminum alloy clad materials have been improved in the following manner so as to provide aluminum alloy materials which have satisfactory strength and corrosion resistance necessary for heat exchangers even when formed into thin members and are thereby usable in heat exchangers. For example, Japanese Unexamined Patent Application Publication (JP-A) No. H11(1999) -61306 discloses a three-layered clad material including an aluminum alloy core material, a filler material on one side of the core material, and a sacrificial anode material on the other side of the core material, in which the sacrificial anode material is composed of an aluminum alloy containing 1.0 to 6.0 percent by mass of zinc (Zn) and further containing manganese (Mn). In the sacrificial anode material, the grain sizes (particle diameters) and distribution of Al—Mn intermetallic compounds are controlled. This reduces the corrosion current of the sacrificial anode material to thereby improve the corrosion resistance of the resulting three-layered clad material. In this technique, the grain sizes and distribution of Al—Mn intermetallic compounds are controlled by adjusting the temperature of a homogenization treatment of ingots of aluminum alloy as the raw material for the sacrificial anode material and the temperature of clad rolling. Japanese Unexamined Patent Application Publication (JP-A) No. 2006-131923 discloses a four-layered material (brazing sheet) which includes a core material composed of an aluminum alloy containing predetermined amounts of Mn and Mg; an intermediate layer cladded on one surface of the core material and composed of an aluminum alloy containing Mn; a filler material cladded on the intermediate layer; and a sacrificial anode material cladded on the other surface of the core material and composed of an aluminum alloy containing 0.5 to 10 percent by mass of Zn and further containing Mn. This technique is intended to improve the strength by adding Mn not only to the core material but also to the sacrificial anode material. The technique is also intended to prevent the generation of local pitting corrosion, by dispersing Al—Mn intermetallic compounds in the sacrificial anode material and thereby allowing the dispersed Al—Mn intermetallic compounds to cause pitting corrosion not locally but uniformly (generally). Japanese Unexamined Patent Application Publication (JP-A) No. 2006-176852 discloses a three-layered clad material including a sacrificial anode material containing 0.2 to 8.0 percent by mass of Zn and further containing Sc and at least one of Mn, Fe, Si, Cu, Mg, and Zr so as to have improved strength and erosion resistance. The addition of these elements allows the aluminum alloy clad material to have further higher resistance both to local corrosion and to general corrosion.

SUMMARY OF THE INVENTION

In a clad material having a small thickness, the sacrificial anode material should have a small thickness, because the core material should have a thickness at a certain level or more to ensure the strength of the clad material. A common sacrificial anode material, if designed to have a small thickness, is worn in early stages, and its activity life for corrosion protection is short, because the clad material is prevented from local corrosion by allowing the entire surface thereof to be preferentially dissolved due to the potential difference between the surface (sacrificial anode material) and the core (core material), as described above. The clad materials disclosed in the above documents, if designed to have a small thickness, may suffer from early wearing of the sacrificial anode material, because they are provided not for resistance to corrosion on the entire surface (general corrosion) but for resistance to pitting corrosion (local corrosion).

Under these circumstances, the present invention has been made, and it is an object of the present invention to provide an aluminum alloy clad material for heat exchangers, which clad material can maintain satisfactory corrosion resistance over the long term even when it has a small thickness.

After intensive investigations to achieve the object, the present inventors have designed the sacrificial anode material to have a zinc (Zn) content higher than those of known sacrificial anode materials. This is because of ensuring a sufficient potential difference between the core material and the sacrificial anode material even when the sacrificial anode material has a small thickness, so as to prevent pitting corrosion. In addition, the present inventors made investigations on techniques for suppressing the general corrosion due to the potential difference between two members and have found that the general corrosion can be suppressed by further incorporating Si and Mn to the sacrificial anode material to allow the resulting aluminum alloy to develop general corrosion resistance.

Specifically, the present invention provides, in an embodiment, aluminum alloy clad material which includes a core material; a sacrificial anode material present on one surface of the core material; and a filler material present on the other surface of the core material and composed of an Al—Si alloy, in which the core material contains 0.3 to 2.0 percent by mass of manganese (Mn), 0.15 to 1.6 percent by mass of silicon (Si), 0.1 to 1.0 percent by mass of copper (Cu), and 0.1 to 1.0 percent by mass of magnesium (Mg), with the remainder including aluminum (Al) and inevitable impurities, the sacrificial anode material contains 7.0 to 12.0 percent by mass of zinc (Zn), 0.3 to 1.8 percent by mass of manganese (Mn), and 0.3 to 1.2 percent by mass of silicon (Si), with the remainder including aluminum (Al) and inevitable impurities, and the sacrificial anode material has a thickness of from 10 to 30 µm.

Thus, the sacrificial anode material has satisfactory resistance to pitting corrosion even when having a small thickness, because the sacrificial anode material has a higher Zn content than those of known equivalents and thereby has a sufficient potential difference with the core material. The addition of Si and Mn to the sacrificial anode material allows the sacrificial anode material to have improved strength and, simultaneously, to develop general corrosion resistance to thereby suppress general corrosion. Independently, the addition of Si and Mn to the core material improves the strength of the core material. The addition of Cu and Mg to the core material further improves the strength, in which Cu helps the core material to be more noble in potential to thereby have an appropriate potential difference with respect to the sacrificial anode material; and Mg forms, via a corrosion product, a protective coating and thereby helps the core material to be more resistant to pitting corrosion even when the core material is exposed to corrosive surroundings.

In the aluminum alloy clad material, the core material may further contain at least one selected from the group consisting of 0.01 to 0.5 percent by mass of titanium (Ti), 0.01 to 0.5 percent by mass of zirconium (Zr), and 0.01 to 0.5 percent by mass of niobium (Nb). The sacrificial anode material may further contain at least one selected from the group consisting of 0.01 to 0.5 percent by mass of Ti, 0.01 to 0.5 percent by mass of Zr, and 0.01 to 0.5 percent by mass of Nb.

The aluminum alloy clad material according to the present invention is resistant both to general corrosion and pitting corrosion (local corrosion) even when including a thin sacrificial anode material, can thereby have a small total thickness, and, when adopted to a heat exchanger, effectively helps the heat exchanger to have a reduced weight and an enlarged lifetime.

DETAILED DESCRIPTION OF THE PREFERRED EMBODIMENTS

Aluminum alloy clad materials according to embodiments of the present invention will be illustrated below.

An aluminum alloy clad material according to an embodiment of the present invention is a three-layered material which includes an aluminum alloy core material; a sacrificial anode material present on one surface of the core material; and a filler material present on the other surface of the core material. Though not critical, the thickness (total thickness) of the aluminum alloy clad material is preferably from 0.1 to 0.3 mm.

Core Material

The core material in the aluminum alloy clad material is composed of an aluminum alloy containing 0.3 to 2.0 percent by mass of Mn, 0.15 to 1.6 percent by mass of Si, 0.1 to 1.0 percent by mass of Cu, and 0.1 to 1.0 percent by mass of Mg, with the remainder including aluminum (Al) and inevitable impurities.

Mn Content in Core Material: 0.3 to 2.0 Percent by Mass

Manganese (Mn) helps the aluminum alloy to have higher strength, as with Silicon (Si). In particular, when in coexistence with Si mentioned below, manganese forms Al—Mn—Si intermetallic compounds to thereby further improve the strength. For ensuring sufficient strength of the aluminum alloy clad material, the Mn content in the core material is 0.3 percent by mass or more, preferably 0.35 percent by mass or more, and more preferably 0.4 percent by mass or more. In contrast, Mn, if present in an excessively large amount, may form coarse precipitates to thereby impair the workability of the aluminum alloy clad material. The Mn content in the core material is therefore 2.0 percent by mass or less, preferably 1.9 percent by mass or less, and more preferably 1.8 percent by mass or less.

Si Content in Core Material: 0.15 to 1.6 Percent by Mass

Silicon (Si) helps the aluminum alloy to have higher strength, as with Mn. In particular, when in coexistence with Mn, silicon forms Al—Mn—Si intermetallic compounds to thereby further improve the strength. For ensuring sufficient strength of the aluminum alloy clad material, the Si content in the core material is 0.15 percent by mass or more, preferably 0.25 percent by mass or more, and more preferably 0.3 percent by mass or more. In contrast, Si, if present in an excessively large amount, may cause melting of the core material upon brazing, because Si acts to lower the melting point of the aluminum alloy. The Si content in the core material is therefore 1.6 percent by mass or less, preferably 1.55 percent by mass or less, and more preferably 1.5 percent by mass or less.

Cu Content in Core Material: 0.1 to 1.0 Percent by Mass

Copper (Cu) helps the aluminum alloy to have higher strength. Cu also helps the aluminum alloy to be more noble in potential, thereby helps the core material to be more noble in potential than the sacrificial anode material. This helps the sacrificial anode material to exhibit higher sacrificial protection activities. For exhibiting these effects sufficiently, the Cu content in the core material is 0.1 percent by mass or more, preferably 0.15 percent by mass or more, and more preferably 0.2 percent by mass or more. In contrast, Cu, if present in an excessively large amount, may cause precipitation of large amounts of copper compounds at grain boundaries, to often cause intergranular corrosion. In addition, the core material, if containing such an excessively large amount of Cu, may have an excessively large potential difference with the sacrificial anode material, and this may accelerate general corrosion. The Cu content in the core material is therefore 1.0 percent by mass or less, preferably 0.95 percent by mass or less, and more preferably 0.9 percent by mass or less.

Mg Content in Core Material: 0.1 to 1.0 Percent by Mass

Magnesium (Mg), as in coexistence with Si, precipitates compounds such as $Mg_2Si$ and thereby helps the aluminum alloy to have a further higher strength, though Mg makes the aluminum alloy less noble in potential. In addition, Mg forms magnesium chloride ($MgCl_2$) as a corrosion product when the aluminum alloy is exposed to corrosive surroundings, and the magnesium chloride acts as a protective film which protects an oxide film on the surface of the aluminum alloy from the corrosive surroundings. In the aluminum alloy clad material according to the present invention, Mg is effective for improving the resistance to local corrosion, because Mg diffuses from the core material to the sacrificial anode material to form a protective film on the surface of the sacrificial anode material upon cladding and/or upon brazing. For exhibiting these effects satisfactorily, the Mg content in the core material is preferably 0.1 percent by mass or more, more preferably 0.12 percent by mass or more, and furthermore preferably 0.14 percent by mass or more. However, Mg, if present in an excessively large amount, may cause the core material to have an insufficient potential difference with respect to the sacrificial anode material to thereby cause the sacrificial anode material to exhibit insufficient sacrificial protection activities, because Mg causes the aluminum alloy to be less noble in potential as described above. In addition, Mg, if present in an excessively large amount, may diffuse even into the filler material during brazing to thereby impair brazing ability, because Mg acts to lower the brazing ability. The Mg content in the core material is therefore 1.0 percent by mass or less, preferably 0.95 percent by mass or less, and more preferably 0.9 percent by mass or less.

The core material in the aluminum alloy clad material may further contain at least one selected from the group consisting of 0.01 to 0.5 percent by mass of Ti, 0.01 to 0.5 percent by mass of Zr, and 0.01 to 0.5 percent by mass of Nb.

Ti, Zr, and Nb Contents in Core Material: Each 0.01 to 0.5 Percent by Mass

Titanium (Ti), zirconium (Zr), and niobium (Nb) respectively act to finely divide corrosion products deposited on a surface of the aluminum alloy exposed to corrosive surroundings and thereby allow the corrosion products to exhibit higher protecting activities. This helps the aluminum alloy clad material to have both higher resistance to local corrosion and higher resistance to general corrosion. These elements develop the above activities when corrosion reaches the core material in the aluminum alloy clad material. For exhibiting these effects satisfactorily, the contents of Ti, Zr, and Nb are each preferably 0.01 percent by mass or more. In contrast, Ti, Zr, and Nb may lower the workability of the aluminum alloy, and the contents of Ti, Zr, and Nb are each thereby preferably 0.5 percent by mass or less.

The core material may contain inevitable impurities such as iron (Fe) in a content of 0.2 percent by mass or less; chromium (Cr) in a content of 0.1 percent by mass or less; and/or boron (B) in a content of 0.1 percent by mass or less.

Sacrificial Anode Material

Thickness of Sacrificial Anode Material: 10 to 30 μm

The thickness of the sacrificial anode material in the aluminum alloy clad material is from 10 to 30 μm. A sacrificial anode material, if having a thickness of less than 10 μm, may be not sufficiently less noble in potential with respect to the core material and may thereby exhibit insufficient sacrificial protection effects, because the absolute amount of Zn contained in the sacrificial anode material is insufficient. Additionally, when the surface of the sacrificial anode material in the aluminum alloy clad material is brazed, Mg diffuses from the core material via such an excessively thin sacrificial anode material to reach the surface of the sacrificial anode material and impairs brazing ability. In contrast, a sacrificial anode material, if having an excessively large thickness of more than 30 μm, may exhibit saturated sacrificial protection effects. Additionally, this sacrificial anode material may cause the aluminum alloy clad material to have an excessively large thickness or may cause the core material to have an excessively small absolute thickness to thereby lower the strength of the core material.

The sacrificial anode material in the aluminum alloy clad material is composed of an aluminum alloy containing 7.0 to 12.0 percent by mass of Zn, 0.3 to 1.8 percent by mass of Mn, and 0.3 to 1.2 percent by mass of Si, with the remainder including Al and inevitable impurities.

Zn Content in Sacrificial Anode Material: 7.0 to 12.0 Percent by Mass

Zinc (Zn) allows the aluminum alloy to be less noble in potential to thereby allow the sacrificial anode material to have a sufficient potential difference with respect to the core material and to exhibit sacrificial protection activities. For exhibiting these effects sufficiently, the Zn content in the sacrificial anode material is 7.0 percent by mass or more, preferably 7.2 percent by mass or more, and more preferably 7.4 percent by mass or more. In contrast, Zn, if present in an excessively large amount, may impair the corrosion resistance of the sacrificial anode material itself, and the resulting sacrificial anode material is corroded at a higher rate to thereby maintain satisfactory sacrificial protection effects for a shorter time period. The Zn content in the sacrificial anode material is therefore 12.0 percent by mass or less, preferably 11.5 percent by mass or less, and more preferably 11.0 percent by mass or less.

Mn Content in Sacrificial Anode Material: 0.3 to 1.8 Percent by Mass and Si Content in Sacrificial Anode Material: 0.3 to 1.2 Percent by Mass Manganese (Mn) and silicon (Si) both help the aluminum alloy to have higher strength. Particularly, the two elements, when present in coexistence, form Al—Mn—Si intermetallic compounds to thereby further improve the strength. In addition, Mn and Si, when dissolved into water (such as cooling water or dew condensation water), respectively form an insoluble film to exhibit general corrosion resistant effects. When the two elements Mn and Si are in coexistence with Zn, they synergistically exhibit further higher general corrosion resistant effects and thereby suppress the general corrosion of the sacrificial anode material, because Zn accelerates the dissolution of these elements. For exhibiting these effects satisfactorily, the contents of Mn and Si in the sacrificial anode material are each 0.3 percent by mass or more, preferably 0.32 percent by mass or more, and more preferably 0.34 percent by mass or more.

In contrast, Mn, if present in an excessively large amount, causes coarse precipitates to thereby lower the workability of the aluminum alloy clad material. Additionally, the precipitates act as cathodic sites to accelerate the corrosion, and the core material may have insufficient resistance to pitting corrosion. The Mn content in the sacrificial anode material is therefore 1.8 percent by mass or less, preferably 1.75 percent by mass or less, and more preferably 1.7 percent by mass or less. Independently, Si, if present in an excessively large amount, may cause the aluminum alloy to have higher susceptibility to intergranular corrosion to thereby have insufficient resistance to pitting corrosion and insufficient general corrosion resistant effects. Additionally, Si in an excessive amount may lower the melting point of the aluminum alloy and may cause the sacrificial anode material to melt upon brazing. This should be avoided, because the sacrificial anode material in the aluminum alloy clad material according to the present invention inherently has a somewhat lowered melting point due to Zn present in a higher content. Accordingly, the Si content in the sacrificial anode material is 1.2 percent by mass or less, preferably 1.0 percent by mass or less, and more preferably 0.9 percent by mass or less.

The sacrificial anode material in the aluminum alloy clad material may further contain at least one selected from the group consisting of 0.01 to 0.5 percent by mass of Ti, 0.01 to 0.5 percent by mass of Zr, and 0.01 to 0.5 percent by mass of Nb.

Ti, Zr, and Nb Contents in Sacrificial Anode Material: Each 0.01 to 0.5 Percent by Mass Titanium (Ti), zirconium (Zr), and niobium (Nb) respectively act to finely divide corrosion products deposited on a surface of the aluminum alloy clad material, i.e., the surface of the sacrificial anode material, and thereby allow the corrosion products to exhibit protecting activities to a further extent to help the aluminum alloy clad material to have both higher resistance to local corrosion and higher resistance to general corrosion. For exhibiting these effects satisfactorily, the contents of Ti, Zr, and Nb in the sacrificial anode material are each preferably 0.01 percent by mass or more. In contrast, Ti, Zr, and Nb act to lower the workability of the aluminum alloy, and the contents of Ti, Zr, and Nb in the sacrificial anode material are each preferably 0.5 percent by mass or less.

The sacrificial anode material may contain, as inevitable impurities, Mg in a content of 0.1 percent by mass or less; and/or Cu in a content of 0.1 percent by mass or less. Magnesium (Mg) acts to lower the brazing ability, and, if present in an excessively large amount of more than 0.1 percent by mass, may impair the brazing ability when brazing is performed on the surface of the sacrificial anode material of the aluminum alloy clad material. Copper (Cu) causes the aluminum alloy to be more noble in potential. Cu, if present in an excessively large amount of more than 0.1 percent by mass, may cause the sacrificial anode material to have an insufficient potential difference with respect to the core material to thereby exhibit insufficient sacrificial protection effects.

Filler Material

Though not critical, the thickness of the filler material in the aluminum alloy clad material is preferably from 10 to 40 μm, for providing satisfactory brazing ability. An Al—Si alloy containing about 6 to 15 percent by mass of Si and generally used in brazing of aluminum alloy materials can be adopted to the filler material in the aluminum alloy clad material. Examples of such Al—Si alloys include Al—Si alloys corresponding to Japanese Industrial Standards (JIS) 4343 alloy and JIS 4045 alloy. The filler material may further contain Zn in addition to Si, so as to impart sacrificial protection effects also to the filler material. The filler material may further contain one or more other elements such as Cu, Mn, and Mg. In this connection, the Mg content is preferably 0.1 percent by mass or less, because Mg, if present in an excessively large amount of more than 0.1 percent by mass, may lower the brazing ability.

The filler material may contain inevitable impurities such as Ti in a content of 0.05 percent by mass or less; Zr in a content of 0.2 percent by mass or less; B in a content of 0.1 percent by mass or less; and/or Fe in a content of 0.2 percent by mass or less. Such inevitable impurities, if present in the above contents, may not impair the advantageous effects of the present invention. An allowable total content of such inevitable impurities in the filler material is 0.4 percent by mass or less.

Production Method of Aluminum Alloy Clad Material

The aluminum alloy clad material according to the present invention can be produced by any method not limited and can for example be produced according to a known method for producing a clad material. An example of such methods will be illustrated below.

Initially, aluminum alloys having compositions corresponding to the core material, sacrificial anode material, and filler material, respectively, are melted, cast, and, where necessary, subjected to facing (surface smoothing treatment of ingots) and to a homogenization treatment, and thereby yield respective ingots. The homogenization treatment may be performed, for example, by conducting a heating treatment at 450° C. to 550° C. for 6 hours or shorter and subsequently cooling the ingots at a cooling rate of 0.5° C. to 2° C. per minute.

Next, the respective ingots are subjected to hot rolling into sheet materials having predetermined thicknesses so as to attain predetermined clad ratios, respectively. Next, the sheet material for core material is sandwiched between the sheet material for sacrificial anode material and the sheet material for filler material to give a laminate; the laminate is subjected to a heat treatment (re-heating) and is compressed and bonded through hot rolling to give an integrated sheet material; the integrated sheet material is thereafter subjected to cold rolling to a predetermined final thickness, and thereby yields an aluminum alloy clad material (clad rolling). During the cold rolling, intermediate annealing (continuous annealing) may be performed according to necessity. In addition or alternatively, the sheet material having the predetermined final thickness may be subjected to finish annealing.

The aluminum alloy clad material according to the present invention, when adopted to a heat exchanger, may for example be formed so that the sacrificial anode material faces corrosive surroundings, and the formed article, where necessary, is incorporated with one or more other members such as fin members, followed by heating for brazing. When adopted to an automotive radiator, the aluminum alloy clad material is particularly preferably formed into a tube member so that the sacrificial anode material faces inward. This further improves the resistance of the inner surface of the radiator against corrosion caused by cooling water.

EXAMPLES

While having been described with reference to embodiments of the present invention, the present invention will be illustrated in further detail with reference to several working examples demonstrating advantageous effects of the present invention, in comparison with comparative examples which do not satisfy the conditions specified in the present invention. It should be noted, however, that these examples are never construed to limit the scope of the present invention.

Preparation of Samples: Samples Nos. 1 to 23

An aluminum alloy for core material having the composition given in Table 1 (Alloy No. C1) was melted, cast at a casting temperature of 700° C. to give ingots, the ingots were then subjected to a homogenization treatment through a heat treatment at 530° C. for 6 hours, cooled at a cooling rate of 0.5° C. per minute, subjected to hot rolling, and thereby yielded a sheet material for core material. Independently, a series of aluminum alloys for sacrificial anode material having the compositions given in Table 2 (Alloys Nos. S1 to S22) was melted, cast at casting temperatures of from 700° C. to 760° C. to give ingots, the ingots were subjected to a homogenization treatment through a heat treatment at 450° C. to 550° C. for 6 hours, cooled at a cooling rate of 0.5° C. per minute, subjected to hot rolling, and thereby yielded a series of sheet materials for sacrificial anode material. Further independently, an Al—Si aluminum alloy for filler material having a Si content of 11 percent by mass was melted, cast under common casting conditions at a casting temperature of 700° C. to give ingots, the ingots were subjected to a homogenization treatment through a heat treatment at 500° C. for 3 hours, subjected to hot rolling, and thereby yielded a sheet material for filler material.

The sheet material for core material was sandwiched between the sheet material for sacrificial anode material and the sheet material for filler material, respectively, to give a laminate, the laminate was subjected to hot rolling at 400° C. to 550° C., thereafter subjected to cold rolling, and thereby yielded samples of aluminum alloy clad materials as Samples Nos. 1 to 23 in Table 2. The thickness of the core material was set to be 0.180 mm, and the thickness of the filler material was set to be 20 μm. The thickness of the sacrificial anode material was 7 μm in Sample No. 16 and was 20 μm in the other samples, as in Table 2.

Preparation of Samples: Samples Nos. 24 to 38

A series of sheet materials for core material was prepared by using aluminum alloys for core material having the compositions given in Tables 3 and 4 (Alloys Nos. C2 to C16) according to the same procedure as with Alloy No. C1. Independently, a series of sheet materials for sacrificial anode material was prepared by using Alloys Nos. S4, and S16 to S22, according to the same procedure as in Samples Nos. 4, and 17 to 23. Further independently, a sheet material for filler material was prepared from an Al—Si alloy having a Si content of 11 percent by mass.

With reference to Table 3, the sheet materials for core material using Alloys Nos. C2 to C9 were sandwiched between the sheet material for sacrificial anode material using Alloy No. S4 and the sheet material for filler material according to the same procedure as in Sample No. 1 and thereby yielded samples of aluminum alloy clad materials as Samples Nos. 24 to 31. Each of the sheet materials for core material using Alloys Nos. C10 to C16 was sandwiched between one selected from the sheet materials for sacrificial anode material using Alloys Nos. S16 to S22 and the sheet material for filler material in the combinations given in Table 4, according to the same procedure as in Samples Nos. 17 to 23 and thereby yielded samples of aluminum alloy clad materials as Samples Nos. 32 to 38. The thickness of the core material was set to be 0.180 mm, and the thicknesses of the filler material and sacrificial anode material were set to be each 20 μm.

The prepared Samples Nos. 1 to 38 were subjected to a heating treatment at 600° C. for 5 minutes. The heating treatment corresponds to heating for brazing. The samples after heating were subjected to corrosion tests below, respectively.

Corrosion Test

To evaluate corrosion resistance properties in surroundings simulating the inside of radiators, each sample (test piece) after the heating treatment was subjected to a corrosion test in which the sample was immersed in a test solution simulating the cooling water and exposed to temperature cycles for one month. Specifically, the sample after the heating treatment was cut to test pieces each 80 mm long and 70 mm wide, washed with acetone, a center portion 70 mm long and 60 mm wide of the surface of the sacrificial anode material was defined as a tested plane, and the surface of each test piece other than the tested plane was covered with a silicon sealant. Specifically, a peripheral region 5 mm from the outer periphery of the surface of the sacrificial anode material, the surface of the filler material, and side end faces of the test piece were covered with the silicone sealant. Each five test pieces were prepared per one sample. The test solution used herein was an OY water (containing 195 ppm by mass of $Cl^-$, 60 ppm by mass of $SO_4^{4-}$, 1 ppm by mass of $C^{2+}$, and 30 ppm by mass of $Fe^{3+}$ and having a pH of 3.0). As the temperature cycles, one temperature cycle was performed per day, in which the test solution was heated from room temperature to 88° C. over one hour, held at 88° C. for 7 hours, cooled to room temperature over one hour, and held at room temperature for 15 hours.

After the corrosion test, each test piece was immersed in nitric acid to remove corrosion products on the surface, and the maximum corrosion depth and thickness loss of the test piece were measured. The maximum corrosion depth was determined by measuring corrosion depths in the tested plane (the surface of the sacrificial anode material side) with an optical microscope according to a focal depth method; determining the deepest corrosion depth in the tested plane; and defining the maximum value among the deepest corrosion depths of the five test pieces as the maximum corrosion depth. The thickness loss was determined by preparing a sample of embedded cross section of each test piece after the corrosion test; measuring thickness of the test piece at ten points in portions where no corrosion pit was generated; determining thickness losses as difference between the thickness of the test piece before the corrosion test and the measured thickness of the test piece after the corrosion test; averaging the data of thickness losses at the ten points per each test piece; further averaging the averaged data of the five test pieces; and defining the final average as the thickness loss.

Next, for each sample, a local corrosion depth $D_{LC}$ and a general corrosion loss $D_{GN}$ were determined based on the above-measured maximum corrosion thickness and thickness loss, assuming that the maximum corrosion thickness and thickness loss of Sample No. 1 being 100, respectively. Sample No. 1 was a comparative example (known equivalent) using an aluminum alloy (Alloy No. S1) containing almost the same amount of Zn, i.e., 4.5 percent by mass of Zn as in the sacrificial anode materials in Patent Documents 1 to 3. The local corrosion depth $D_{LC}$ is a performance index for the resistance to pitting corrosion, and the general corrosion loss is a performance index for the resistance to general corrosion. For corrosion resistance, a sample is acceptable herein when it has both a local corrosion depth $D_{LC}$ of 50 or less and a general corrosion loss $D_{GN}$ of 60 or less. The local corrosion depth $D_{LC}$ and the general corrosion loss $D_{GN}$ of each sample are shown in Tables 2 to 4, according to the criteria as follows. For Sample No. 4 in Table 2, the composition and the evaluation of corrosion resistance of the aluminum alloy for core material (Alloy No. C1) are shown in Table 3.

Criteria for Local Corrosion Depth $D_{LC}$:

AA: 20 or less,

A: more than 20 but 40 or less,

B: more than 40 but 50 or less,

C: more than 50 but 60 or less,

D: more than 60 but 80 or less, and

DD: more than 80

Criteria for General Corrosion Loss $D_{GN}$:

AA: 40 or less,

A: more than 40 but 50 or less,

B: more than 50 but 60 or less,

C: more than 60 but 80 or less,

D: more than 80 but 100 or less, and

DD: more than 100

TABLE 1

| Alloy type | Core material aluminum alloy composition (percent by mass) | | | | | | | |
|---|---|---|---|---|---|---|---|---|
| | Mn | Si | Cu | Mg | Ti | Zr | Nb | Al*1 |
| C1 | 1.0 | 0.75 | 0.5 | 0.5 | — | — | — | remainder |

*1Including inevitable impurities

TABLE 2

| Sample Category | No. | Core material Alloy type | Sacrificial anode material Alloy type | Aluminum alloy composition (percent by mass)[*1] Zn | Mn | Si | Ti | Zr | Nb | Thickness (μm) | Resistance to pitting corrosion | General corrosion resistance |
|---|---|---|---|---|---|---|---|---|---|---|---|---|
| Comparative | 1 | C1 | S1 | 4.5* | 0.05* | 0.05* | — | — | — | 20 | DD | D |
| Examples | 2 | C1 | S2 | 9.0 | 0.05* | 0.05* | — | — | — | 20 | D | DD |
| Examples | 3 | C1 | S3 | 7.5 | 0.85 | 0.48 | — | — | — | 20 | B | A |
| | 4 | C1 | S4 | 9.0 | 0.85 | 0.48 | — | — | — | 20 | A | A |
| | 5 | C1 | S5 | 10.8 | 0.85 | 0.48 | — | — | — | 20 | A | B |
| Comparative | 6 | C1 | S6 | 13.0* | 0.85 | 0.4 | — | — | — | 20 | C | D |
| Examples | 7 | C1 | S7 | 9.0 | 0.05* | 0.4 | — | — | — | 20 | D | DD |
| Examples | 8 | C1 | S8 | 9.0 | 0.32 | 0.48 | — | — | — | 20 | B | B |
| | 9 | C1 | S9 | 9.0 | 1.75 | 0.48 | — | — | — | 20 | B | B |
| Comparative | 10 | C1 | S10 | 9.0 | 2.0* | 0.4 | — | — | — | 20 | D | D |
| Examples | 11 | C1 | S11 | 9.0 | 0.85 | 0.05* | — | — | — | 20 | D | DD |
| Examples | 12 | C1 | S12 | 9.0 | 0.85 | 0.32 | — | — | — | 20 | B | A |
| | 13 | C1 | S13 | 9.0 | 0.85 | 0.88 | — | — | — | 20 | B | B |
| | 14 | C1 | S14 | 9.0 | 0.85 | 1.0 | — | — | — | 20 | B | B |
| Comparative | 15 | C1 | S15 | 9.0 | 0.85 | 1.4* | — | — | — | 20 | D | D |
| Examples | 16 | C1 | S4 | 9.0 | 0.85 | 0.48 | — | — | — | 7* | C | B |
| Examples | 17 | C1 | S16 | 9.0 | 0.85 | 0.48 | 0.3 | — | — | 20 | A | AA |
| | 18 | C1 | S17 | 9.0 | 0.85 | 0.48 | — | 0.3 | — | 20 | A | AA |
| | 19 | C1 | S18 | 9.0 | 0.85 | 0.48 | — | — | 0.3 | 20 | A | AA |
| | 20 | C1 | S19 | 9.0 | 0.85 | 0.48 | 0.2 | 0.2 | — | 20 | A | AA |
| | 21 | C1 | S20 | 9.0 | 0.85 | 0.48 | 0.2 | — | 0.2 | 20 | A | AA |
| | 22 | C1 | S21 | 9.0 | 0.85 | 0.48 | — | 0.2 | 0.2 | 20 | A | AA |
| | 23 | C1 | S22 | 9.0 | 0.85 | 0.48 | 0.1 | 0.1 | 0.1 | 20 | A | AA |

*Out of the range specified in the present invention
[*1]The remainder including Al and inevitable impurities

TABLE 3

| Sample Category | No. | Core material Alloy type | Aluminum alloy composition (percent by mass)[*1] Mn | Si | Cu | Mg | Ti | Zr | Nb | Sacrificial anode material Alloy type | Resistance to pitting corrosion | General corrosion resistance |
|---|---|---|---|---|---|---|---|---|---|---|---|---|
| Example | 4 | C1 | 1.0 | 0.75 | 0.5 | 0.5 | — | — | — | S4 | A | A |
| Comparative | 24 | C2 | 0.1* | 0.75 | 0.5 | 0.5 | — | — | — | S4 | C | C |
| Examples | 25 | C3 | 2.3* | 0.75 | 0.5 | 0.5 | — | — | — | S4 | C | C |
| | 26 | C4 | 1.0 | 0.08* | 0.5 | 0.5 | — | — | — | S4 | C | C |
| | 27 | C5 | 1.0 | 1.8* | 0.5 | 0.5 | — | — | — | S4 | C | C |
| | 28 | C6 | 1.0 | 0.75 | —* | 0.5 | — | — | — | S4 | C | C |
| | 29 | C7 | 1.0 | 0.75 | 1.5* | 0.5 | — | — | — | S4 | C | C |
| | 30 | C8 | 1.0 | 0.75 | 0.5 | —* | — | — | — | S4 | C | C |
| | 31 | C9 | 1.0 | 0.75 | 0.5 | 1.5* | — | — | — | S4 | C | C |

*Out of the range specified in the present invention
[*1]The remainder including Al and inevitable impurities

TABLE 4

| Sample Category | No. | Core material Alloy type | Aluminum alloy composition (percent by mass)[*1] Mn | Si | Cu | Mg | Ti | Zr | Nb | Sacrificial anode material Alloy type | Aluminum alloy composition (percent by mass)[*1] Zn | Mn | Si | Ti | Zr | Nb | Resistance to pitting corrosion | General corrosion resistance |
|---|---|---|---|---|---|---|---|---|---|---|---|---|---|---|---|---|---|---|
| Examples | 32 | C10 | 1.0 | 0.75 | 0.5 | 0.5 | 0.3 | — | — | S16 | 9.0 | 0.85 | 0.48 | 0.3 | — | — | AA | AA |
| | 33 | C11 | 1.0 | 0.75 | 0.5 | 0.5 | — | 0.3 | — | S17 | 9.0 | 0.85 | 0.48 | — | 0.3 | — | AA | AA |
| | 34 | C12 | 1.0 | 0.75 | 0.5 | 0.5 | — | — | 0.3 | S18 | 9.0 | 0.85 | 0.48 | — | — | 0.3 | AA | AA |
| | 35 | C13 | 1.0 | 0.75 | 0.5 | 0.5 | 0.2 | 0.2 | — | S19 | 9.0 | 0.85 | 0.48 | 0.2 | 0.2 | — | AA | AA |
| | 36 | C14 | 1.0 | 0.75 | 0.5 | 0.5 | 0.2 | — | 0.2 | S20 | 9.0 | 0.85 | 0.48 | 0.2 | — | 0.2 | AA | AA |
| | 37 | C15 | 1.0 | 0.75 | 0.5 | 0.5 | — | 0.2 | 0.2 | S21 | 9.0 | 0.85 | 0.48 | — | 0.2 | 0.2 | AA | AA |
| | 38 | C16 | 1.0 | 0.75 | 0.5 | 0.5 | 0.1 | 0.1 | 0.1 | S22 | 9.0 | 0.85 | 0.48 | 0.1 | 0.1 | 0.1 | AA | AA |

[*1]The remainder including Al and inevitable impurities

Evaluation on Sacrificial Anode Material

As is demonstrated in Table 2, Sample No. 2 differs from Sample No. 1 as a known equivalent only in an increased content of Zn, has thereby somewhat improved resistance to pitting corrosion due to an increased potential difference with respect to the core material, but shows inferior general corrosion resistance to that of Sample No. 1. In contrast, Samples Nos. 3 to 5, 8, 9, and 12 to 14 show both improved resistance to pitting corrosion and improved general corrosion resistance, because these samples are examples, in which the aluminum alloy constituting the sacrificial anode material contains Zn in combination with both Mn and Si within the ranges specified in the present invention. However, Sample No. 16 does not exhibit sufficient sacrificial protection effects, because this sample uses a sacrificial anode material having the same composition as in Sample No. 4 but having an insufficient thickness, and the absolute amount of Zn in the sacrificial anode material is thereby insufficient. Sample No. 6 suffers from general corrosion, because this sample has an excessively large Zn content in the sacrificial anode material and thereby has an excessively large potential difference between the sacrificial anode material and the core material. Samples Nos. 7 and 11 suffer from corrosion to the same extent as in Sample No. 2, because these samples have an insufficient content of one of Mn and Si and thereby fail to exhibit sufficient general corrosion resistance. Sample No. 10 has an excessively large Mn content in the sacrificial anode material to cause coarse precipitates, and thereby shows inferior corrosion resistance. Sample No. 15 has an excessively large Si content in the sacrificial anode material to increase susceptibility to intergranular corrosion and thereby suffers from inferior corrosion resistance.

Evaluation on Core Material

As is demonstrated in Table 3, Sample No. 4 is an example using an aluminum alloy for core material having a composition within the range specified in the present invention, in combination with the sacrificial anode material containing Zn, Mn, and Si within ranges as specified in the present invention and thereby shows satisfactory corrosion resistance. In contrast, Samples Nos. 24 and 26 show insufficient corrosion resistance, because the core materials in these samples have an insufficient Mn content and an insufficient Si content, respectively, to allow Mn and Si diffuse from the sacrificial anode material to the core material, and the amounts of Mn and Si in the sacrificial anode material thereby become insufficient. Sample No. 25 suffers from insufficient corrosion resistance, because its core material has an excessively large Mn content, to allow Mn to diffuse from the core material to the sacrificial anode material to thereby cause coarse precipitates in the sacrificial anode material. Sample No. 27 suffers from insufficient corrosion resistance, because its core material has an excessively large Si content, to allow Si to diffuse from the core material to the sacrificial anode material, and this increases the susceptibility to intergranular corrosion. Sample No. 28 shows insufficient resistance to pitting corrosion, because its core material has an insufficient Cu content (contains no Cu) and thereby has a small potential difference with respect to the sacrificial anode material. In contrast, Sample No. 29 has an excessively large Cu content in the core material, thereby suffers from increased pitting corrosion (increased corrosion depth) due to intergranular corrosion and suffers from general corrosion due to an excessively large potential difference between the core material and the sacrificial anode material. Sample No. 30 suffers from insufficient resistance to pitting corrosion, because its core material has an insufficient Mg content (contains no Mg), to cause Mg to diffuse from the sacrificial anode material to the core material, and thereby Mg present in the sacrificial anode material becomes insufficient. In contrast, Sample No. 31 also suffers from insufficient resistance to pitting corrosion, because its core material has an excessively large Mg content and thereby has a small potential difference with respect to the sacrificial anode material.

Evaluation on Addition of Ti, Zr, and/or Nb

As is demonstrated in Table 2, Samples Nos. 17 to 23 are examples in which at least one of Ti, Zr, and Nb is added to aluminum alloys for sacrificial anode material having the compositions as specified in the present invention. These samples show further improved resistance to pitting corrosion (resistance to local corrosion) and resistance to general corrosion by the actions of these elements. As is demonstrated in Table 4, Samples Nos. 32 to 38 are examples in which at least one of Ti, Zr, and Nb is added not only to aluminum alloys for sacrificial anode material but also to aluminum alloys for core material. These samples show further improved corrosion protection effects.

What is claimed is:

1. An aluminum alloy clad material comprising:
   a core material;
   a sacrificial anode material present on one surface of the core material; and
   a filler material present on the other surface of the core material and, which comprises an Al—Si alloy,
   the core material consisting of:
      0.3 to 2.0 percent by mass of manganese (Mn),
      0.15 to 1.6 percent by mass of silicon (Si),
      0.1 to 1.0 percent by mass of copper (Cu),
      0.1 to 1.0 percent by mass of magnesium (Mg), and
      optionally, 0.01 to 0.5 percent by mass of at least one selected from the group consisting of titanium (Ti), zirconium (Zr), and niobium (Nb),
      with the remainder including aluminum (Al) and inevitable impurities, the sacrificial anode material consisting of:
      9.0 to 12.0 percent by mass of zinc (Zn),
      0.3 to 1.8 percent by mass of manganese (Mn),
      0.3 to 1.2 percent by mass of silicon (Si), and
      optionally, 0.01 to 0.5 percent by mass of at least one selected from the group consisting of titanium (Ti), zirconium (Zr), and niobium (Nb),
      with the remainder including aluminum (Al) and inevitable impurities, and the sacrificial anode material having a thickness of from 10 to 30 μm.

2. The aluminum alloy clad material according to claim 1, wherein the core material contains at least one selected from the group consisting of 0.01 to 0.5 percent by mass of titanium (Ti), 0.01 to 0.5 percent by mass of zirconium (Zr), and 0.01 to 0.5 percent by mass of niobium (Nb).

3. The aluminum alloy clad material according to claim 1, wherein the sacrificial anode material contains at least one selected from the group consisting of 0.01 to 0.5 percent by mass of titanium (Ti), 0.01 to 0.5 percent by mass of zirconium (Zr), and 0.01 to 0.5 percent by mass of niobium (Nb).

4. The aluminum alloy clad material according to claim 2, wherein the sacrificial anode material contains at least one selected from the group consisting of 0.01 to 0.5 percent by mass of titanium (Ti), 0.01 to 0.5 percent by mass of zirconium (Zr), and 0.01 to 0.5 percent by mass of niobium (Nb).

5. The aluminum alloy clad material according to claim 1, wherein the thickness of the aluminum alloy clad material ranges from 0.1 to 0.3 mm.

6. The aluminum alloy clad material according to claim 1, wherein the Mn content in the core material ranges from 0.4 to 1.8 percent by mass.

7. The aluminum alloy clad material according to claim 1, wherein the Si content in the core material ranges from 0.3 to 1.5 percent by mass.

8. The aluminum alloy clad material according to claim 1, wherein the Cu content in the core material ranges from 0.2 to 0.9 percent by mass.

9. The aluminum alloy clad material according to claim 1, wherein the Mg content in the core material ranges from 0.14 to 0.9 percent by mass.

10. The aluminum alloy clad material according to claim 1, wherein said inevitable impurities in said core material is at least one selected from the group consisting of no more than 0.2 percent by mass of iron (Fe), no more than 0.1 percent by mass of chromium (Cr), and no more than 0.1 percent by mass of boron (B).

11. The aluminum alloy clad material according to claim 1, wherein the Zn content in the sacrificial anode material ranges from 9.0 to 11.0 percent by mass.

12. The aluminum alloy clad material according to claim 1, wherein the Mn content in the sacrificial anode material ranges from 0.34 to 1.7 percent by mass.

13. The aluminum alloy clad material according to claim 1, wherein the Si content in the sacrificial anode material ranges from 0.34 to 0.9 percent by mass.

14. The aluminum alloy clad material according to claim 1, wherein said inevitable impurities in said sacrificial anode material is at least one selected from the group consisting of no more than 0.1 percent by mass of magnesium (Mg) and no more than 0.1 percent by mass of copper (Cu).

15. The aluminum alloy clad material according to claim 1, wherein the thickness of said filler material ranges from 10 to 40 μm.

16. The aluminum alloy clad material according to claim 1, wherein the Al—Si alloy of said filler material comprises 6 to 15 percent by mass of Si.

17. The aluminum alloy clad material according to claim 1, wherein the filler material further comprises zinc (Zn).

18. The aluminum alloy clad material according to claim 1, wherein the filler material further comprises at least one additional element selected from the group consisting of copper (Cu), manganese (Mn), and magnesium (Mg).

19. The aluminum alloy clad material according to claim 18, wherein the additional element is magnesium and the content of magnesium does not exceed 0.1 percent by mass.

20. The aluminum alloy clad material according to claim 1, wherein the filler material further comprises at least one inevitable impurity selected from the group consisting of no more than 0.05 percent by mass of titanium (Ti), no more than 0.2 percent by mass of zirconium (Zr), no more than 0.1 percent by mass of boron (B), and no more than 0.2 percent by mass of iron (Fe).

21. An aluminum alloy clad material comprising:
   a core material;
   a sacrificial anode material present on one surface of the core material; and
   a filler material present on the other surface of the core material and, which comprises an Al—Si alloy,
   the core material consisting of:
   0.3 to 2.0 percent by mass of manganese (Mn),
   0.15 to 1.6 percent by mass of silicon (Si),
   0.1 to 1.0 percent by mass of copper (Cu),
   0.1 to 1.0 percent by mass of magnesium (Mg), and
   0.01 to 0.5 percent by mass of niobium (Nb),
   with the remainder including aluminum (Al) and inevitable impurities, the sacrificial anode material consisting of:
   7.0 to 12.0 percent by mass of zinc (Zn),
   0.3 to 1.8 percent by mass of manganese (Mn),
   0.3 to 1.2 percent by mass of silicon (Si), and
   optionally, 0.01 to 0.5 percent by mass of at least one selected from the group consisting of titanium (Ti), zirconium (Zr), and niobium (Nb),
   with the remainder including aluminum (Al) and inevitable impurities, and the sacrificial anode material having a thickness of from 10 to 30 μm.

* * * * *